Figure 1:
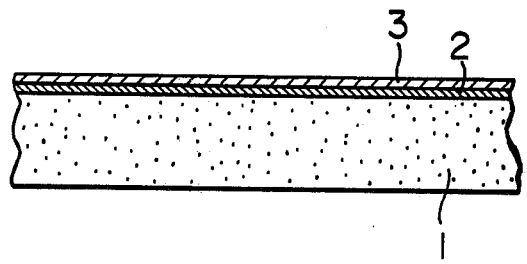

United States Patent [19]
Nakagawa et al.

[11] 4,397,906
[45] Aug. 9, 1983

[54] MULTILAYER STRUCTURAL BUILDING MATERIAL

[75] Inventors: Yoshihiro Nakagawa, Kusatsu; Hachirou Yuura, Shiga, both of Japan

[73] Assignee: Sekisui Kagaku Kogyo Kabushiki Kaisha, Osaka, Japan

[21] Appl. No.: 258,557

[22] Filed: Apr. 29, 1981

[30] Foreign Application Priority Data

Apr. 30, 1980 [JP] Japan .................................. 55-58418

[51] Int. Cl.³ .............................................. B32B 3/10
[52] U.S. Cl. .................................. 428/195; 428/206; 428/314.4; 428/317.3; 428/317.7; 428/319.7; 428/323; 428/328; 428/354; 428/355

[58] Field of Search ............... 428/206, 195, 207, 208, 428/142–148, 304.4, 314.4, 314.8, 317.7, 317.1, 317.3, 317.5, 318.4, 319.1, 319.3, 323, 328, 329, 331, 354, 355

[56] References Cited

U.S. PATENT DOCUMENTS

| | | | |
|---|---|---|---|
| 3,619,343 | 11/1971 | Freeman | 428/317.7 |
| 3,726,754 | 4/1973 | Coglianese | 428/318.4 |
| 4,288,490 | 9/1981 | Alfter et al. | 428/314.8 |

Primary Examiner—William J. Van Balen
Attorney, Agent, or Firm—Wenderoth, Lind & Ponack

[57] ABSTRACT

A multilayer structural building material comprising a polyolefin or polybutadiene foam sheet as a base layer, a dry coated layer of a polychloroprene-type adhesive as an interlayer, and a dry coated layer of a mixture of a water-base adhesive and an inorganic filler as a surface layer.

8 Claims, 3 Drawing Figures

U.S. Patent     Aug. 9, 1983     4,397,906

MULTILAYER STRUCTURAL BUILDING MATERIAL

This invention relates to a multilayer structural building material suitable for use as a backing material in walls, ceilings, floors, etc.

Backing materials composed of polyolefin or polybutadiene foams have heretofore been used to produce a heat insulating effect and a cushioning effect between a base material such as a wall, ceiling, floor, etc. and a surface material such as a wall paper and a nonwoven fabric. Since, however, the polyolefin or polybutadiene foams generally have a low polarity or a low surface tension, only a limited number of adhesives are available which have high adhesiveness and can withstand use. In general, organic solvent-base adhesives obtained by dissolving natural and synthetic rubbers, acrylic copolymers, etc. in organic solvents are frequently used. On the other hand, the surface material is available in many design patterns, and in order to match design patterns, it is inconvenient to bond the surface material to a backing material in advance. Thus, it is the practice to perform the bonding operation within a completed building although this is undesirable in view of a bad working environment caused by the dangerous nature of the solvents which are generally toxic and flammable. In the bonding operation, an organic solvent-base adhesive is coated on the surface of a base material such as a wall and the surface of a backing material, and after drying, the coated surfaces are bonded to each other. The bonded material has high adhesion, but after the bonding operation, it is extremely difficult to make a subtle change in the position of the backing material or remove creases. The bonding of a surface material to the backing material is performed in the same way.

It is an object of this invention therefore to provide a multilayer structural building material suitable for use as an architectural backing material which can be bonded by using a water-base adhesive instead of the organic solvent-base adhesives at the site of construction, and which even after the bonding operation, permits easy adjustment of the position of a surface material and easy removal of creases from the surface material.

The present invention provides a multilayer structural building material comprising a polyolefin or polybutadiene foam sheet as a base layer, a dry coated layer of a polychloroprene-type adhesive as an interlayer, and a dry coated layer of a mixture of a water-base adhesive and an inorganic filler as a surface layer.

The multilayer structural building material of the invention is most suitable for use as a backing material in walls, ceilings, floors, etc.

Specific embodiments of the structural building material of this invention are described with reference to the accompanying drawings in which:

FIG. 1 is a sectional view of one example of the multilayer structural building material of this invention consisting of a polyolefin or polybutadiene foam sheet 1, a dry coated layer 2 of a polychloroprene-type adhesive as an interlayer placed on one surface of the sheet 1 and a dry coated layer 3 of a mixture of a water-base adhesive and an inorganic filler as a surface layer on the interlayer 2.

Figure 2:
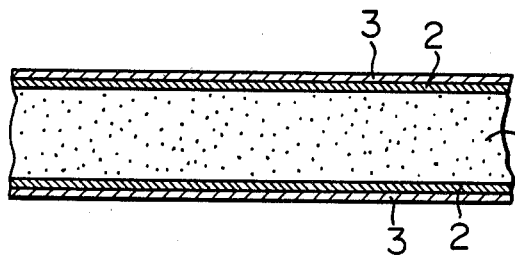
Figure 3:
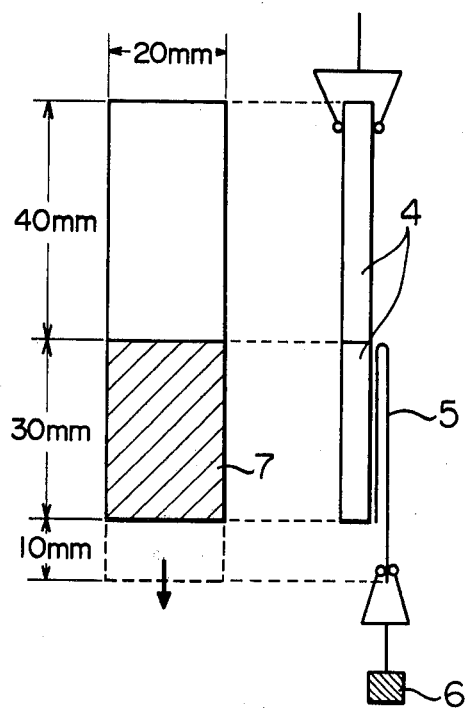

FIG. 2 is a sectional view of another example of the multilayer structural building material of this invention consisting of the polyolefin or polybutadiene foam sheet 1 and formed on both surfaces thereof, the aforesaid interlayer 2 and the surface layer 3; and FIG. 3 is a view showing a test specimen for use in a peel test in water.

Polyolefinic resins used as a starting material for the foam sheet in accordance with this invention include homopolymers of olefins such as ethylene, propylene, butylene and isobutylene, copolymers of at least 50% by weight of the above-exemplified olefins and comonomers such as vinyl acetate, methyl acrylate, ethyl acrylate, butyl acrylate, methyl methacrylate, acrylic acid and styrene, and copolymers of at least 50% by weight of at least two of the above-exemplified olefins. Specific examples of such polyolefinic resins are polyethylene, polypropylene, an ethylene/vinyl acetate copolymer, an ethylene/propylene copolymer, an ethylene/butyl acrylate copolymer, and a sodium salt of an ethylene/acrylic acid copolymer. Among these, polyethylene, an ethylene/vinyl acetate copolymer and polypropylene are preferred, and polyethylene is especially preferred.

The polybutadiene used as a starting material for the foam sheet in accordance with this invention denotes not only polybutadiene, but also copolymers containing at least 50% by weight of a butadiene unit. Examples of comonomers which can be used to prepare such butadiene copolymers include styrene, acrylonitrile, chloroprene, and methyl methacrylate. Among these polybutadiene resins, polybutadiene and a styrene/butadiene copolymer are preferred. A polymer blend containing the aforesaid polyolefinic resin and polybutadiene resin as a base can also be used to produce the foam sheet in accordance with this invention.

The polyolefinic resin is preferred to the polybutadiene resin, and polyethylene is especially preferred.

The foam sheet may be provided in various thicknesses and apparent densities depending upon the material which constitutes the sheet and upon its uses. Suitable foam sheets 1 have a thickness of 2 to 30 mm, and an apparent density of 0.02 to 0.05 g/cm$^3$. If the sheet 1 has an open cellular structure, it is difficult to coat an adhesive (to be described hereinbelow) on it, and its water permeating property adversely affects the base material. Closed cellular foam sheets, on the other hand, are suitable for use in architectural backing materials because of their excellent thermal insulation, compression characteristics, water resistance and non-permeability to water. Accordingly, the latter type gains much acceptance.

The dry coating 2 of a chloroprene-type adhesive and the dry coating 3 of a mixture of a water-base adhesive and an inorganic filler are coated on one surface of the sheet 1 as shown in FIG. 1, and preferably on both surfaces of the sheet 1 as shown in FIG. 2.

The chloroprene-type adhesive used in the invention is a solution of a chloroprene rubber in a suitable organic solvent such as toluene, hexane, ethyl acetate and mixtures thereof. In order to maintain stable adhesion to polyolefin or polybutadiene foam sheets, the chloroprene rubber preferably has a degree of crystallization below a medium level and a crystallization speed below a medium level. If desired, a tackiness-imparting agent, a curing agent, etc. may be added to the chloroprene-type adhesive. Examples of the chloroprene rubber are copolymers, blocked copolymers and graft copolymers of chloroprene and comonomers such as vinyl acetate, methyl acrylate, methyl methacrylate, acrylic acid, vinyl ether and glycidyl methacrylate. A graft copolymer of chloroprene with vinyl acetate or methyl acrylate is preferred. The chloroprene-type adhesive used in this invention generally has a solids concentration of 5 to 30%, and the amount of its coating is suitably 1 to 30 g/m$^2$ calculated as solids. Examples of the tackiness imparting agent as an optional component are phenolic resins, petroleum resins and natural resins, and examples of the curing agent as an optional component include toluene diisocyanate, and metal oxides such as magnesium oxide and zinc oxide.

In producing the multilayer structural building material of the invention, after the coated layer of the chloroprene-type adhesive is forcedly or spontaneously dried, a mixture of a water-base adhesive and an inorganic filler is coated thereon to form a dry coated layer 3 of the mixture.

The term "water-base adhesive", as used herein, denotes an adhesive which is used as a solution or dispersion in water, and develops adhesion strength upon removal of water. Examples of water-dissolved adhesives are polyvinyl alcohol, methylol urea, methylol phenol, gum arabic and starch pastes. Polyvinyl alcohol is preferred. Examples of water-dispersed adhesives are vinyl acetate-type adhesives, acrylic adhesives and vinyl ether-type adhesives, and the vinyl acetate-type adhesives are preferred. The water-dispersed adhesives are preferred to the water-dissolved adhesives, and the vinyl acetate adhesives are especially preferred. The vinyl acetate-type adhesives also include aqueous dispersions of copolymers of at least 50% by weight of vinyl acetate with a comonomer such as acrylic acid, ethylene, and an acrylic acid ester such as methyl acrylate, ethyl acrylate, propyl acrylate, butyl acrylate, 2-ethylhexyl acrylate and hydroxyethyl acrylate.

A mixture of two or more water-base adhesives may also be used.

The "inorganic filler", as used herein, denotes a fine powder of an inorganic material. Examples of such an inorganic material include calcium carbonate, calcium sulfate, aluminum oxide, magnesium oxide, calcium silicate, aluminum silicate, silicic anhydride, aluminum hydroxide, talc and clay. Inorganic fillers which have been calcined or treated with coupling agents, etc. are also included within the inorganic fillers used in this invention. Among these fillers, the aluminum compounds are preferred, and a fine powder of aluminum hydroxide and a fine powder of aluminum silicate are especially preferrd, and give good results in regard to overall properties including fire retardancy, operability in bonding, and retention of adhesion strength. The inorganic filler used in the architectural backing in this invention is preferably bulky, and is used in an average particle diameter of preferably 0.1 to 300 microns, especially preferably 1 to 100 microns, and most preferably 10 to 50 microns. If the average diameter of the inorganic filler is less than 0.1 micron, many cracks occur in the inorganic filler-containing layer of the building material at the time of bending, and if it exceeds 300 microns, the storage stability of the mixture of the water-base adhesive and the inorganic filler is poor, and the solids (the filter and the solid component of the adhesive) separate and settle down.

The proportion of the inorganic filler is 50 to 90% by weight, preferably 70 to 80% by weight, based on the total weight of the inorganic filler and the solids of the water-base adhesive. If it is less than 50% by weight, the backing materials obtained adhere to each other under the influence of water, humidity, heat, mechanical pressures, etc., and it is sometimes necessary to insert sheets of releasing paper between the backing materials. This not only greatly reduces the efficiency of working at the site of construction, but also increases the cost. Moreover, the multilayer structural building material become relatively stiff, and numerous cracks occur on its surface. On the other hand, if the proportion of the inorganic filler exceeds 90% by weight, the inorganic filler scatters from the surface of the multilayer structural material upon friction, etc., and its adhesiveness becomes unstable.

If desired, a mold-proofing agent, a fire retardant, a viscosity controlling agent, etc. may be incorporated in the mixture of the water-base adhesive and the inorganic filler.

The amount of the mixture of the aqueous water-base adhesive and the inorganic filler to be coated is 2 to 50 g/m$^2$, preferably 5 to 20 g/m$^2$, calculated as solids, and the amounts within this range give good results.

The mixture of the water-base adhesive and the inorganic filler may be coated on the entire surface of the sheet 1, or in dots, lines, curves, etc. Desirably, the coating is carried out by a gravure coating technique.

If the amount of the mixture of the water-base adhesive and the inorganic filler exceeds 50 g/m$^2$, cracks occur in the resulting product at the time of bening. If it is less than 2 g/m$^2$, blocking occurs, and the adhesiveness of the resulting product which is attributed to the use of the water-base adhesive becomes unstable.

The dry coated layer of the mixture of the water-base adhesive and the inorganic filler does not adhere to itself even when water is included therein, pressures are applied thereto, or it is dried. Nor does it adhere to other materials upon application of heat to its surface. This means that when the structural building materials in accordance with this invention are stocked indoors or left temporarily at the site of construction, they do not adhere to each other under the influence of water or solar heat, and thus, have increased storage stability. When the structural material of this invention is to be bonded to a well paper by a water-base adhesive using a laminator in a factory, the trouble of adhering of the structural material to a hot roll is obviated in the drying step, etc. Furthermore, the structural material of this invention is flexible, and even when bent, does not develop cracks and creases on its surface. In application, the dry coated layer 3 of the mixture well absorbs a starch-type adhesive, a vinyl acetate emulsion adhesive, etc. to contribute to firm adhesion.

For example, in bonding the structural material of this invention to a wooden wall material and bonding a wall paper as a surface material to the wall material, a water-base adhesive such as a vinyl acetate-type adhesive is coated on a wall or the structural material of this invention, and then the structural material is press-bonded to the wall. After some degree of adhesion strength develops with time, a water-base adhesive, such as a starch-type adhesive or a mixture of it with a vinyl acetate-type adhesive, is coated on the structural material of the invention or on a wall paper, and then the wall paper is lightly press-bonded to the structural material of this invention. Then, within a short period of time, the position of the wall paper is adjusted, creases are removed, the air entrained is removed, etc. to complete the bonding operation.

The structural material of the invention as shown in FIG. 1 is useful as an intermediate material in bonding a wall paper thereto by means of an organic solvent-base adhesive in a factory which maintains a good environmental control, and a heat-insulating wall paper which can be applied by means of water-base adhesives is obtained.

In the same way as in the case of the aforesaid wall material, the structural material of this invention can be bonded to a floor material such as concrete, and a surface material composed of asbestos slate, a hardboard, a plywood, etc. can be bonded to the structural material. In particular, when the surface material is a parquet tile, such tiles are frequently joined by so-called rabbet joint utilizing tongues and grooves provided on the side surfaces of these tiles. Thus, the surface material (parquet tile) is required to be movable relatively easily while it is in contact with the backing material. Since the structural material of this invention is applied by means of a water-base adhesive, meticulous adjustment of joining is very easy until the bonding strength of the surface material develop.

The multilayer structural building material of this invention having the above-described construction is easy to handle and has good storage stability. Furthermore, before the water-base adhesive used to bond the multilayer structural building material of this invention to the surface material dries, the exchange of the surface material and the change of its position can be effected easily. Furthermore, removal of creases or entrained air can be easily effected when the surface material is a wall paper or the like. After the water-base adhesive has dried, excellent adhesion strengths at the bonded surface can be obtained.

In bonding a surface material to the multilayer structural building material of this invention at the site of construction, it is not necessary to coat organic solvent-base adhesives on the surface material and the multilayer structural material. Hence, this is beneficial from the standpoint of hygiene and environment. Water-base adhesives, particularly starch-type adhesives, which the builders are accustomed to handle, can be used. Furthermore, it is not necessary to carry organic solvent-base adhesives to congested sites of construction. Accordingly, the multilayer structural building material of this invention is also advantageous in controlling works and materials.

The following Examples illustrate the present invention.

EXAMPLE 1

On one surface of an irradiation-crosslinked polyethylene foam sheet having a thickness of 3 mm and an apparent density of 0.034 g/cm$^3$ was coated a primer composed of a 10% by weight toluene solution of low-crystalline chloroprene rubber as a main ingredient at a rate of 15 g/m$^2$ (as a solution), and fully dried. On the primer layer was coated a mixed solution consisting of 100 parts by weight of a vinyl acetate/ethylene copolymer emulsion having a solids content of 30% by weight, 130 parts by weight of calcined aluminum silicate having an average particle diameter of 40 microns and 140 parts by weight of water at a rate of 10 g/m$^2$ (calculated as solids), followed by drying with hot air at 80° C.

The resulting multilayer structural building material was a pliable white sheet having a tack-free surface, and did not undergo cracking at the surface even when bent.

When two such resulting multilayer structural materials were dipped in water, and the coated surfaces were adhered to each other in the state and dried, no blocking occurred.

A commercially available starch paste was coated on a veneer, a concrete plate, a gypsum board and a wall paper, respectively, and the treated surface of the above structural material was press-bonded to each of these materials, and dried. It well adhered to these materials, and a peel test resulted in fracture at the foam sheet portion of the structural material.

EXAMPLE 2

A closed cellular foam sheet of a copolymer rubber composed of 15% by weight of styrene and 85% by weight of butadiene which had a thickness of 5 mm and an apparent density of 0.087 g/cm$^3$ was used. A chloroprene-type adhesive as a toluene solution having a solids content of 17% by weight was coated on one surface of the foam sheet at a rate of 14 g/m$^2$ (as a solution), and then fully dried. A uniform dispersion was prepared from 20% by weight (as a solution) of a copolymer emulsion of 80% by weight of vinyl acetate and 20% by weight of butyl acrylate (solids content 50% by weight), 30% by weight of aluminum hydroxide having an average particle diameter of 45 microns and 50% by weight of water, and uniformly coated on the chloroprene resin layer at a rate of 25 g/m$^2$ (as a dispersion), followed by complete dring at 90° C.

The resulting multilayer structural material was a pliable white sheet having a tack-free surface, and even when bent, did not undergo creasing or cracking at the surface.

When this structural material was dipped in water, its surface did not peel off. When the coated surfaces of two such structural materials were laid together in the wet state and dried, they did not adhere to each other.

By using a commercially available wood-working vinyl acetate emulsion, a wall paper lined with paper was bonded to the coated surface of the structural material and well dried. They adhered to each other fully. When a peeling force was applied to the bonded assembly, the paper was damaged at its middle part.

EXAMPLE 3

A dry coated layer of a polychloroprene-type adhesive (2 g/m$^2$) and a dry coated layer (10 g/m$^2$) of a mixture consisting of 75% by weight of aluminum silicate and 25% by weight of a copolymer of 90% by weight of vinyl acetate and 10% by weight of ethylene were formed in the same way as in Example 1 on both surfaces of a crosslinked polyethylene foam sheet having an apparent density of 0.025 g/cm$^3$ and a thickness of 4 mm.

The resulting product had an appearance and properties which well withstood practical use. Its adhesive properties with respect to a veneer, a slate and wall papers were as shown in the following table.

| Combination of materials to be bonded | | Adhesive | Adhesiveness in the dry state | Adhesiveness in water at 20° C. | |
|---|---|---|---|---|---|
| | | | | Falling time (minutes) | Condition |
| PVC-type wall paper | Veneer | Starch paste | Fracture of the paper | 2.5 | Cohesive fracture of the paper |
| PVC-type wall paper | Slate | Starch paste | Fracture of the paper | 1.4 | Cohesive fracture of the paper |
| Product of Ex. 3 | Slate | Vinyl acetate emulsion | Fracture of the foam | more than 10,000 | Peeling of the foam from the base material |
| Product of Ex. 3 | Veneer | Starch paste | Fracture of the foam | 19.8 | Peeling of the foam from the base material |
| Product of Ex. 3 | Slate | Starch paste | Fracture of the foam | 74.7 | Peeling of the foam from the base material |
| Product of Ex. 3 | PVC-type wall paper | Starch paste | Fracture of the paper | 2.3 | Cohesive fracture of the paper |
| Product of Ex. 3 | PVC-type wall paper | Vinyl acetate emulsion | Fracture of the paper | 6.1 | Cohesive fracture of the paper |
| Product of Ex. 3 | Fibrous wall paper | Starch paste | Fracture of the paper | 4.0 | Cohesive fracture of the paper |

The adhesive properties were measured as follows:

1. Adhesiveness in the dry state

The materials shown in the above table were bonded by using each of the specified adhesives, fully dried, and then subjected to a 180° peel test by hand at room temperature. The surface coated with the adhesive was as follows:

In the case of a wall paper and a wall base material, it was the wall paper; in the case of a wall paper and the product of Example 3, it was the wall paper; and in the case of the product of Example 3 and the wall base material, it was the product of Example 3.

2. Adhesiveness in water

A measuring sample (with 20 mm, length 70 mm) as shown in FIG. 3 was prepared, and subjected to a 180° peel test under a fixed load in water.

When a veneer or slate is bonded to the product of this invention, the reference numeral 4 in FIG. 3 shows the veneer or slate and the reference numeral 5 shows the product of the invention. When the product of the invention is to be bonded to a wall paper, the reference numeral 4 shows the product of this invention and 5, the wall paper. The reference numeral 6 represents a load, and 7, a bonded surface.

The time which elasped until the bonded portion (20 mm in width and 30 mm in length) of the sample peeled off under a load of 97 g in water (116 g in the air) was determined, and defined as the falling time (minutes).

EXAMPLE 4

On one surface of an irradiation-crosslinked polyethylene foam sheet having a thickness of 3 mm and an apparent density of 0.034 g/cm$^3$ was coated a primer composed of a 10% by weight toluene solution of low-crystalline chloroprene rubber as a main ingredient at a rate of 15 g/m$^2$ (as a solution), and fully dried. On the primer layer was coated a mixed solution consisting of 100 parts by weight of an aqueous solution of polyvinyl alcohol having a solids content of 15% by weight, 100 parts of calcined aluminum silicate having an average particle diameter of 40 microns and 140 parts by weight of water at a rate of 10 g/m$^2$ (as solids), followed by drying with hot air at 80° C.

The resulting multilayer structural building material was a pliable white sheet having a tack-free surface, and did not undergo cracking at the surface even when bent.

A commercially available starch paste was coated on a veneer, a concrete plate, a gypsum board and a wall paper, respectively, and the treated surface of the above structural material was press-bonded to each of these materials, and dried. It well adhered to these materials, and a peel test resulted in fracture at the foam sheet portion of the structural material.

What we claim is:

1. A multilayer structural building material which is especially suitable as a backing material with one side bonded to walls, ceilings or floors and the other side bonded to a surface material of wall paper or a non woven fabric, said multilayer structural material comprising a polyolefin or polybutadiene foam sheet as a base layer, a dry coated layer of a polychloroprene-type adhesive as an interlayer, and a dry coated layer of a mixture of a water-base adhesive and an inorganic filler as a surface layer.

2. The material of claim 1 wherein the amount of the inorganic filler is 50 to 90% by weight based on the total weight of the inorganic filler and the solid of the water-base adhesive.

3. The material of claim 1 or 2 wherein the average particle diameter of the inorganic filler is 0.1 to 300 microns.

4. The material of claim 1 or 2 wherein the water-base adhesive is a vinyl acetate-type adhesive.

5. The material of any one of claims 1 or 2 wherein the inorganic filler is aluminum silicate or aluminum hydroxide.

6. The material of claims 1 or 2 wherein the mixture of a water-base adhesive and an inorganic filler is coated in dots or lines.

7. The material of claims 1 or 2 wherein the foam sheet is a polyethylene foam sheet.

8. The material of any one of claims 1 or 2 wherein the foam sheet is a closed cellular foam sheet.

* * * * *